(12) United States Patent
Tsumiyama et al.

(10) Patent No.: US 9,511,806 B2
(45) Date of Patent: Dec. 6, 2016

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Keiji Takahashi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,516

(22) Filed: Dec. 30, 2014

(65) Prior Publication Data

US 2016/0185406 A1 Jun. 30, 2016

(51) Int. Cl.
*B62D 63/02* (2006.01)
*B60P 1/28* (2006.01)
*B62D 33/06* (2006.01)

(52) U.S. Cl.
CPC .................. *B62D 63/02* (2013.01); *B60P 1/28* (2013.01); *B62D 33/06* (2013.01)

(58) Field of Classification Search
CPC .......... B62D 63/02; B62D 33/06; B60P 1/28
See application file for complete search history.

(56) References Cited

U.S. PATENT DOCUMENTS 9,187,023 B2* 11/2015 Takahashi ................. B60P 1/16
2007/0236037 A1 10/2007 Kobayashi et al.

FOREIGN PATENT DOCUMENTS

JP 4828987 11/2011

* cited by examiner

*Primary Examiner* — Glenn Dayoan
*Assistant Examiner* — Melissa A Black
(74) *Attorney, Agent, or Firm* — Wenderoth, Lind & Ponack, L.L.P.

(57) ABSTRACT

A utility vehicle that includes a seat row, a cargo bed, an engine chamber under the cargo bed, and cabin walls surrounding a cabin. The utility vehicle further includes a first partition wall covering the rear side of the cabin and thereby partitioning the engine chamber and the cabin from each other; and a second partition wall covering the upper portion of the front portion of the engine chamber.

4 Claims, 10 Drawing Sheets

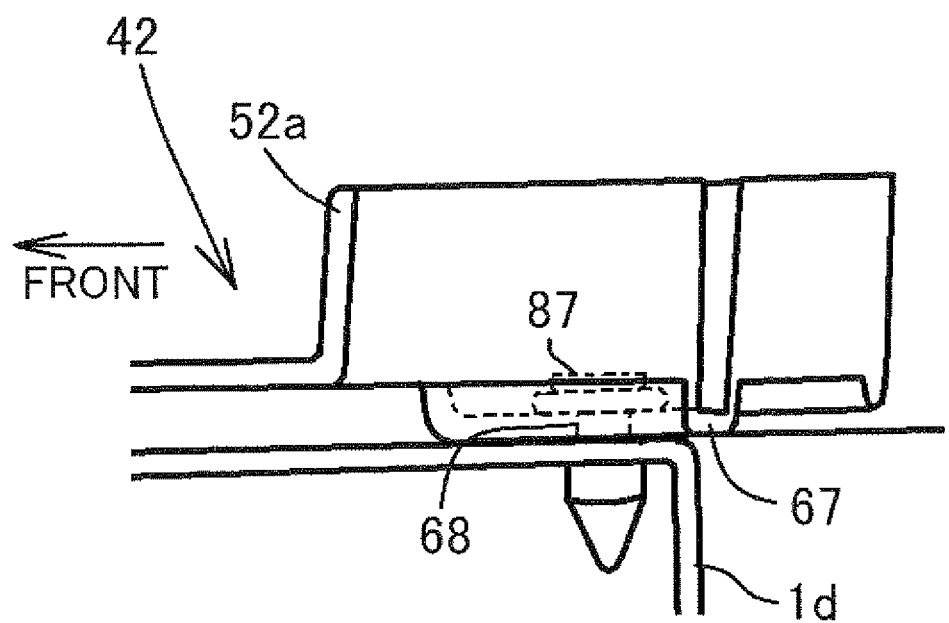

UTILITY VEHICLE

BACKGROUND OF THE INVENTION

1. Field of the Invention

The present invention relates to a utility vehicle, in particular, to a utility vehicle in which surroundings of a cabin is enclosed by cabin walls and an engine chamber is located under a cargo bed.

2. Description of the Prior Art

In a utility vehicle provided with cabin walls, an inside of the cabin is protected from rain, snow, mud, or cold by the cabin walls. Nevertheless, in a utility vehicle of the conventional art, the inside of the cabin and the engine chamber located on a rear side are in fluid communication with each other through a lower space under a seat. Thus, while driving, in some cases, outside air, dust, or exhaust gas flows into the cabin through the lower space under a rear-side cabin wall and under the seat. Further, heat of the engine located under the cargo bed is easily conducted to the cabin. An example of prior art references is Japanese Patent No. 4828987. In a utility vehicle disclosed in this technical reference, an engine chamber is formed under a seat and the engine is accommodated in the engine chamber.

SUMMARY OF THE INVENTION

The present invention has been devised from the perspective of the above-mentioned problems. An object thereof is to avoid a situation that outside air, dust, or exhaust air on a rear side of the vehicle flows into the cabin and to suppress a situation that engine heat is conducted to the cabin. The utility vehicle according to the present invention comprises one seat row or more seat rows; a cargo bed arranged behind the seat row or rows; an engine chamber provided under the cargo bed; a cabin for accommodating the seat row or rows; a plurality of cabin walls for surrounding the cabin; a first partition wall arranged under a rear-side cabin wall for covering a rear side of the cabin, the first partition wall partitioning the engine chamber and the cabin from each other; and a second partition wall extended from an upper end portion of the first partition wall to a front end portion of the cargo bed, the second partition wall covering an upper front portion of the engine chamber.

According to the above-mentioned configuration, a situation can be avoided that outside air, dust, or exhaust gas on the rear side of the vehicle flows into the cabin through a lower space under the seat row. Further, a situation can be suppressed that engine heat is conducted to the cabin.

Further, since the front portion of the engine chamber and the upper front portion are covered by the first partition wall and the second partition wall, protection of the engine from the outside can be improved.

In the above-mentioned configuration, the present invention preferably employs the following configurations.

(a) The cargo bed is turnable or rotatable around a pivot provided at a rear portion of the vehicle so as to raise a front portion of the cargo bed. According to this configuration, the engine chamber can be opened and closed easily by raising and lowering the cargo bed. This ensures easy maintenance.

(b) An outer peripheral edge portion of the first partition wall is attached to a vehicle body frame with a sealing member in between. According to this configuration, a sealing property against the outside of the cabin is improved.

(c) An upper space above the second partition wall forms a space surrounded by the rear-side cabin wall and a front panel of the cargo bed. According to this configuration, the upper space can be used as a baggage storage space.

BRIEF DESCRIPTION OF THE DRAWINGS

The above and other objects, features, and advantages of the present invention will become more apparent from the following description taken in connection with the accompanying drawings, in which:

FIG. 10 is an enlarged sectional perspective view of a rear end portion of the second partition wall of the utility vehicle of FIG. 1.

DETAILED DESCRIPTION OF THE PREFERRED EMBODIMENTS

FIGS. 1 to 10 show a utility vehicle according to the present invention, and on the basis of these drawings, an embodiment of the present invention will be described. For convenience of explanation, an advancing direction of the utility vehicle is explained as the "front" of the utility vehicle and the respective components thereof, and "left" and "right" as viewed from the driver or the passenger of the vehicle is explained as the "left" and "right" of the vehicle and the respective components thereof.

Figure 2:
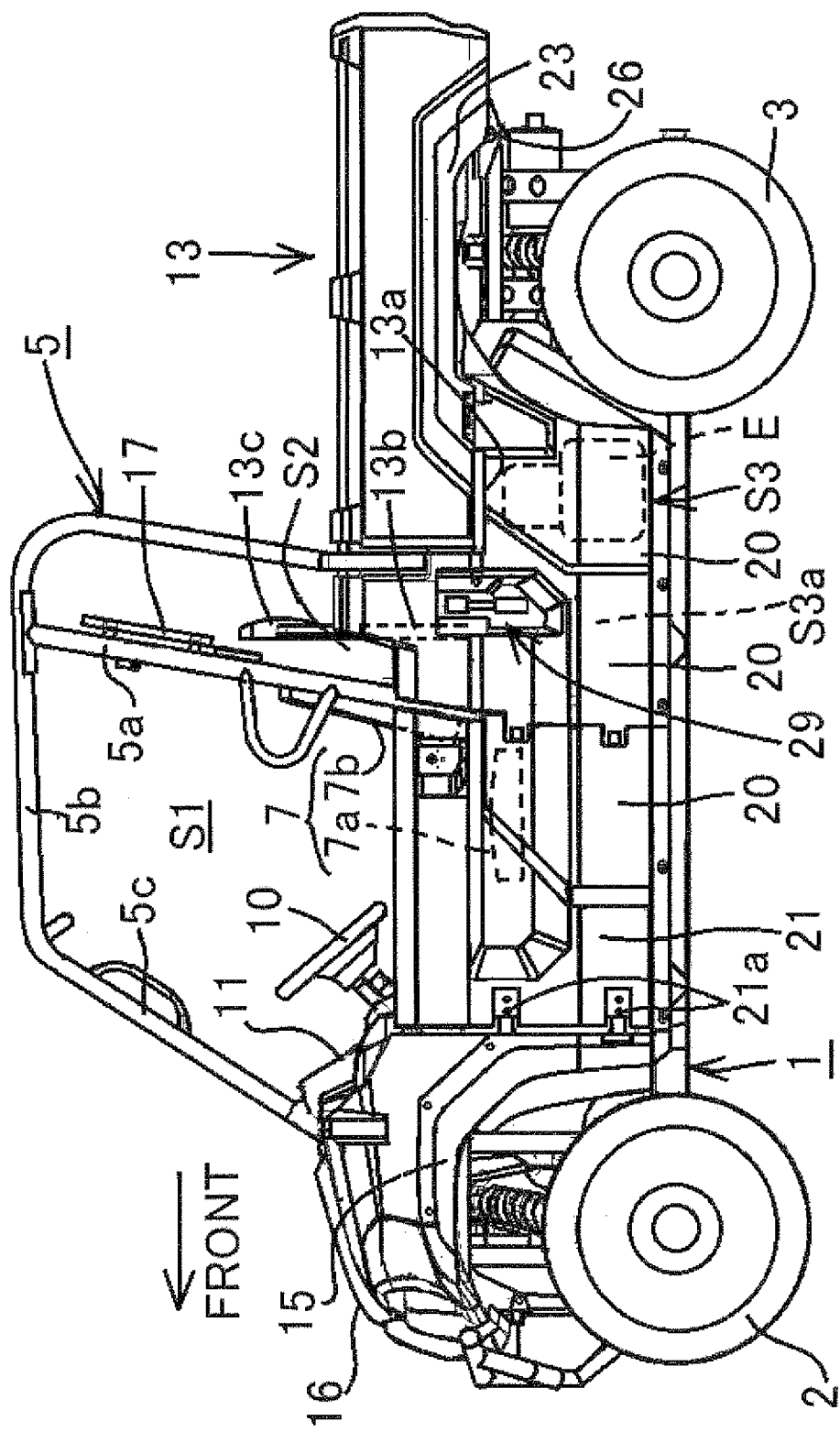
FIG. 2 is a left side view of the utility vehicle of FIG. 1, where cabin walls are removed.

FIG. 2 shows the utility vehicle in a state that cabin walls are removed. In FIG. 2, the utility vehicle comprises a vehicle body frame 1, left and right front wheels 2 disposed at a front end portion of the vehicle body frame 1, and left and right rear wheels 3 disposed at a rear end portion of the vehicle body frame 1. A cabin (a riding space) S1 is positioned between the front wheels 2 and the rear wheels 3 in a front-rear direction, and is enclosed with a R.O.P.S. 5. A bench-type seat 7 is arranged in the cabin S1. The bench-type seat 7 includes a seat plate 7a and a backrest 7b rising from a rear end portion of the seat plate 7a. Further, a steering wheel 10 and a dash panel 11 are disposed at a front end portion of the cabin S1. The above-mentioned R.O.P.S. is an abbreviation for rollover protective structure.]

Further, in the utility vehicle, a dumping-type cargo bed 13 is provided behind the cabin S1, and left and right front fenders 15 and a hood 16 are provided on a front side of the cabin S1. Further, an engine chamber S3 is provided under a front portion of the cargo bed 13, and an engine E is arranged in a engine chamber S3. A rear end portion of the lower surface of the dumping-type cargo bed 13 is rotatably supported on the vehicle body frame 1 through left and right pivot shafts 26. Then, the cargo bed 13 is locked to the vehicle body frame 1 by latch devices 29. The latch devices 29 are provided at both of left and right sides of the front portion of the cargo bed 13. That is, when the fixed state of the cargo bed 13 by the latch devices 29 is released, the cargo bed 13 can be position-changed between a lowered position (a normal position shown in FIGS. 1 and 2) and a dumping position (an inclined position) in which the front end portion of the cargo bed 13 has been raised by rotation about the pivot shafts 26.

A grid-shaped upper screen 17 is arranged above the back rest 7b of the seat 7, and the upper screen 17 partitions the cabin S1 and an upper space above the cargo bed 13 from each other. The upper screen 17 is supported by intermediate vertical members 5a in the left and right of the R.O.P.S. 5. Left and right side covers 20 and left and right doors 21 are disposed on left and right sides of the cabin S1, and the left and right side covers 20 are extended to left and right rear fenders 23 through lower portions of left and right ends of the cargo bed 13, respectively.

Figure 1:
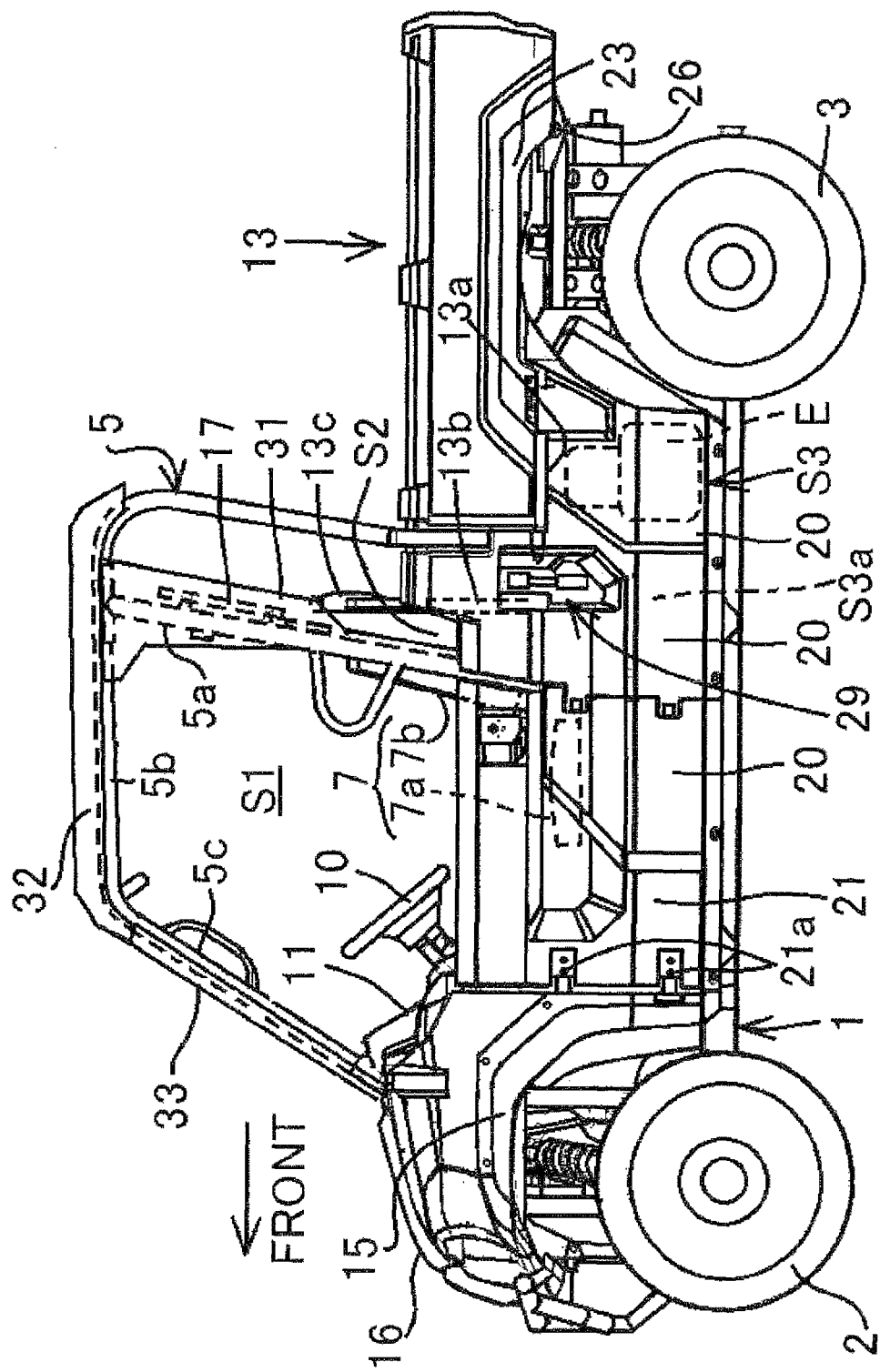
FIG. 1 is a left side view of a utility vehicle according to the present invention.

FIG. 1 shows a situation that the cabin S1 is surrounded by cabin walls. The cabin walls consist of a rear-side cabin wall 31 for covering a rear side of the cabin S1, a ceiling wall 32 for covering an upper portion of the cabin S1, a transparent front window 33 for covering a front side of the cabin S1, and the above-mentioned left and right doors 21. Although not illustrated, each of the left and right doors 21 may be provided with a side window located in the upper portion.

The rear-side cabin wall 31 is arranged on a rear side of the back rest 7b and attached to the left and right intermediate vertical members 5a and the left and right upper end members 5b of the R. O. P. S. 5 in an attachable and detachable manner with brackets and bolts. The ceiling wall 32 is attached to the left and right upper end members 5b of the R.O.P.S. 5 with brackets and bolts. The front window 33 is attached to the left and right front vertical members 5c of the R.O.P.S. 5 in an attachable and detachable manner with brackets and bolts. A front end portion of each of the left and right doors 21 is rotatably supported on the vehicle body frame 1 through hinges 21a. Each of the doors 21 is rotated about the hinges 21a so as to be opened and closed.

Figure 3:
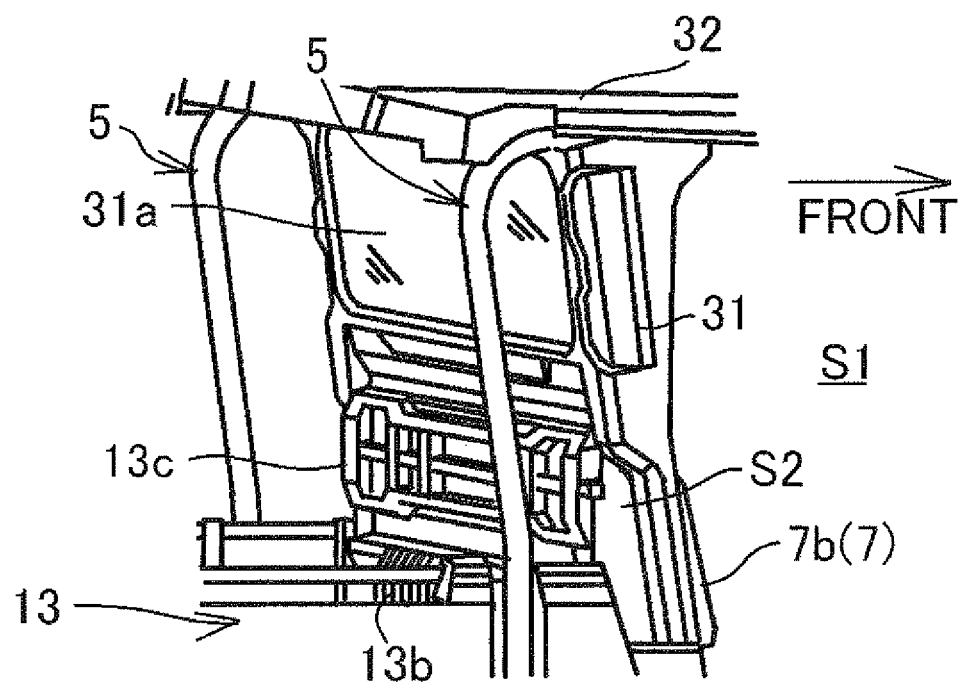
FIG. 3 is a perspective view in which a rear-side cabin wall of the utility vehicle of FIG. 1 is viewed from a rear right side.

In FIG. 3, the rear-side cabin wall 31 is provided with a transparent rear window 31a located in an upper half portion. Then, a passenger in the cabin S1 can visually recognize the rearward through the rear window 31a.

Figure 4:
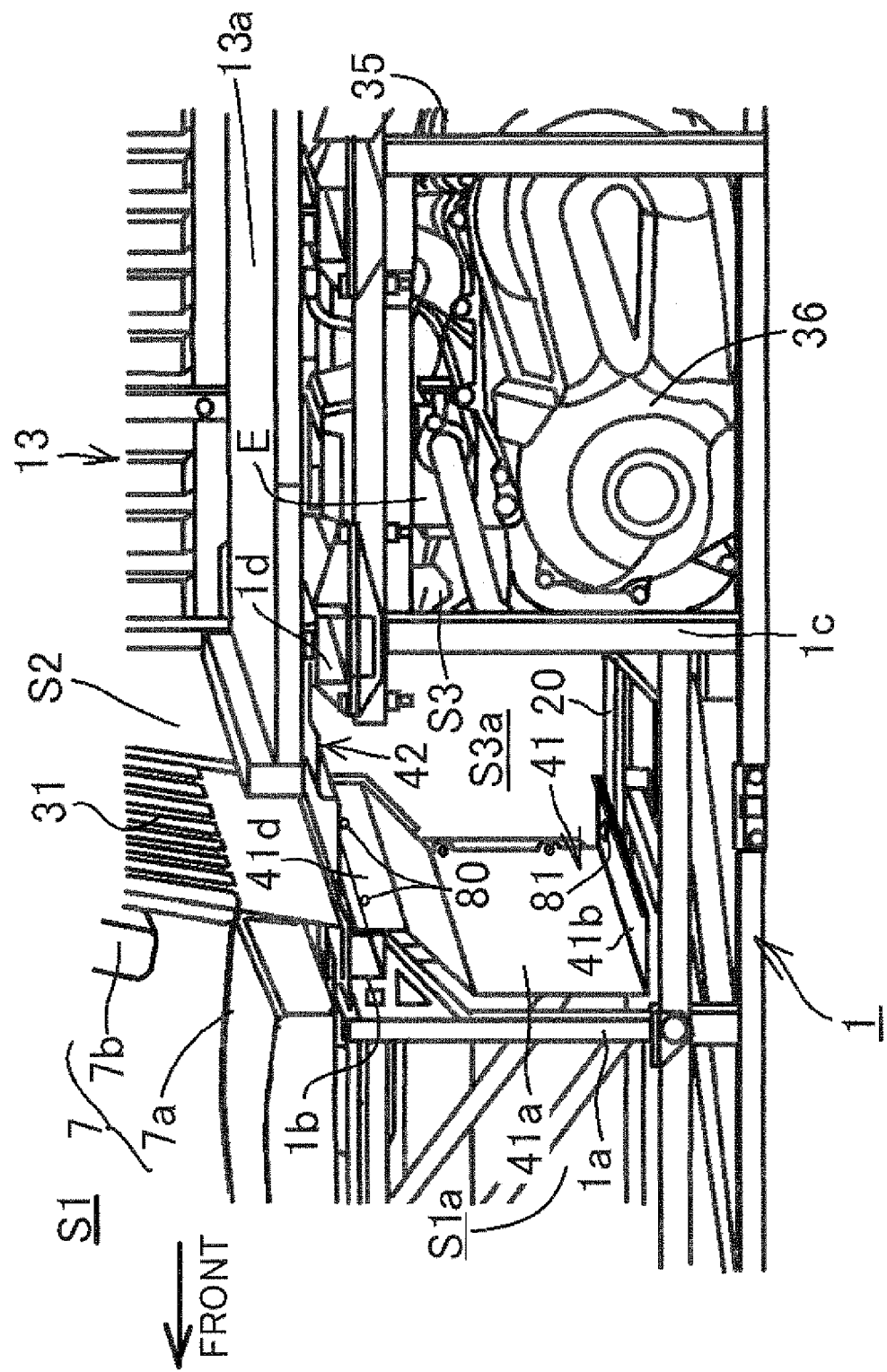
FIG. 4 is a perspective view in which an engine chamber of the utility vehicle of FIG. 1 is viewed from a rear left side.

In FIG. 4, an engine chamber is formed under a base plate 13a of the cargo bed 13. An engine E is accommodated in an inside of the engine chamber S3. A gear type transmission 35 and a V-belt type continuously variable transmission 36 are also arranged in the engine chamber S3. The gear type transmission 35 is arranged on a rear side of the engine E in the inside of the engine chamber S3, and the V-belt type continuously variable transmission 36 is arranged and extends from a left side surface of the engine E to a left side surface of the gear type transmission 35. A front-side space S3a is formed by extending the engine chamber S3 frontward, and the front-side space S3a is ensured between a rear end of a seat frame 1a and a front end of the engine E.

A front side of the front-side space S3a is covered by a first partition wall 41. Further, an upper portion of the front-side space S3a is covered by a second partition wall 42. Both of left and right sides of the front-side space S3a are covered by the vehicle side-covers 20 (see FIGS. 1 and 2). The first partition wall 41 rises from a bottom portion of the vehicle body frame 1. Thereby the first partition wall 41 partitions the front-side space S3a and a lower space S1a under the seat plate 7a in the cabin S1 from each other. The second partition wall 42 extends rearward approximately horizontally from an upper rear end of the seat frame 1a so as to reach an upper front end portion of a cargo bed support frame 1c. An upper space 62 located above the second partition wall 42 is surrounded by the rear-side cabin wall 31, a front panel 13b (see FIG. 1) of the cargo bed 13, and a lower screen 13c (see FIG. 1) extending upward from the front panel 13b.

Figure 5:
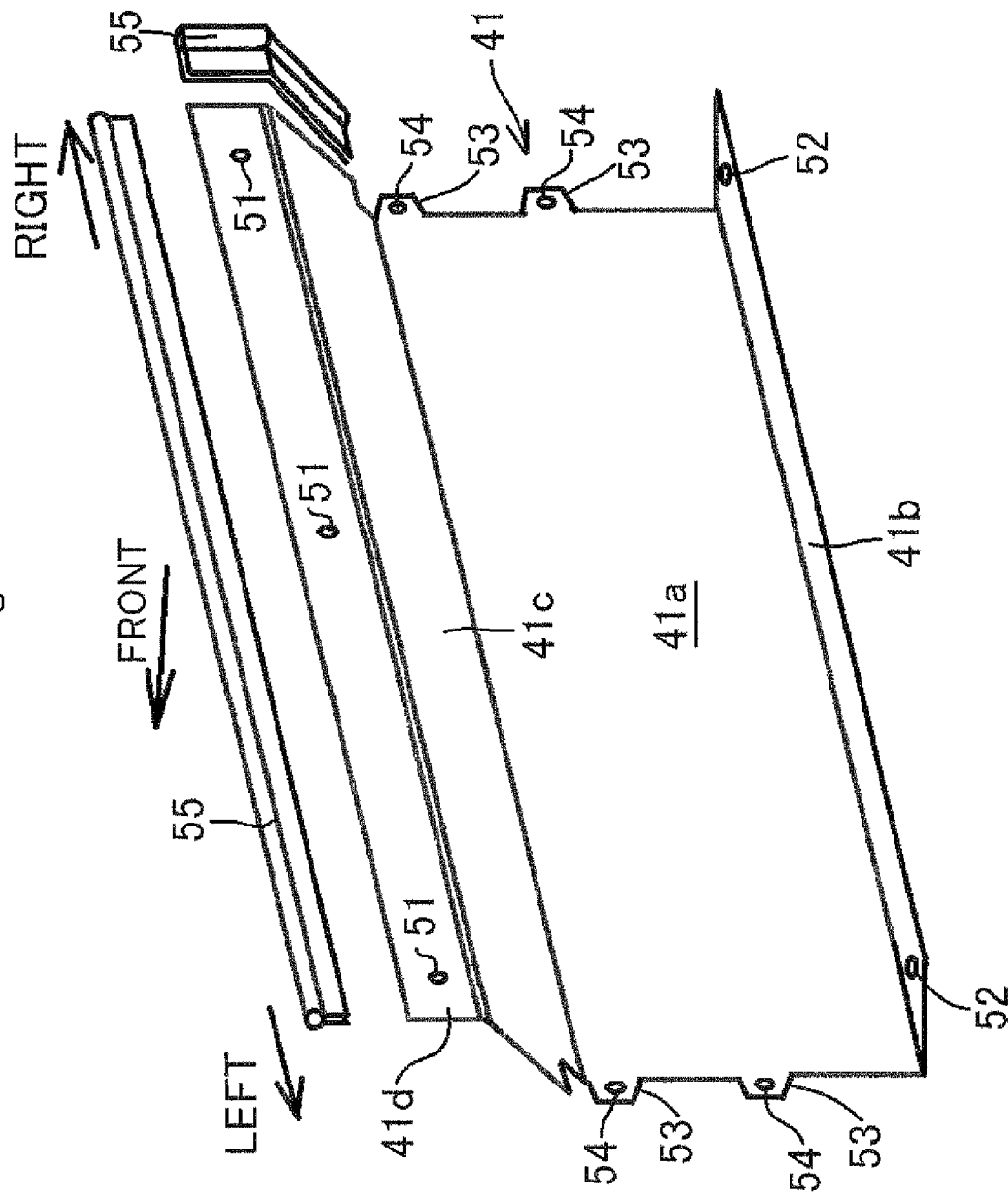
FIG. 5 is a perspective view showing a first partition wall of the utility vehicle of FIG. 1.

FIG. 5 is a perspective view of the first partition wall 41. The first partition wall 41 is made of hard resin or the like. The first partition wall 41 integrally includes a main body 41a, a lower-end attached portion 41b, an inclined surface portion 41c, and an upper-end attached portion 41d. The main body 41a is extended in a vehicle width direction (left and right direction) and in a vertical direction along a plane at right angles to the front-rear direction. The lower-end attached portion 41b is bent rearward from a lower end of the main body 41a. The inclined surface portion 41c is extended upward and rearward from an upper end of the main body 41a. The upper-end attached portion 41d is extended vertically upward from the inclined surface portion 41c.

The upper-end attached portion 41d is provided with a plurality (e.g., three) of attached holes 51 arranged with intervals in the vehicle width direction (in the left and right direction). The lower-end attached portion 41b is provided with attached holes 52 located in left and right end portions. Each of the left and right edges of the main body 41a is provided with a pair of upper and lower attached pieces 53. Each of the attached pieces 53 is provided with an attached hole 54. A trim seal 55 having a U-shaped cross section and made of elastic material is attached to an upper end of the upper-end portion 41d. Further, a trim seal 55 which is similar to the above-mentioned one and which has a U-shaped cross section and is made of elastic material is attached to the left and right ends of the upper attached portion 41d and left and right ends of the inclined surface portion 41c.

Figure 6:
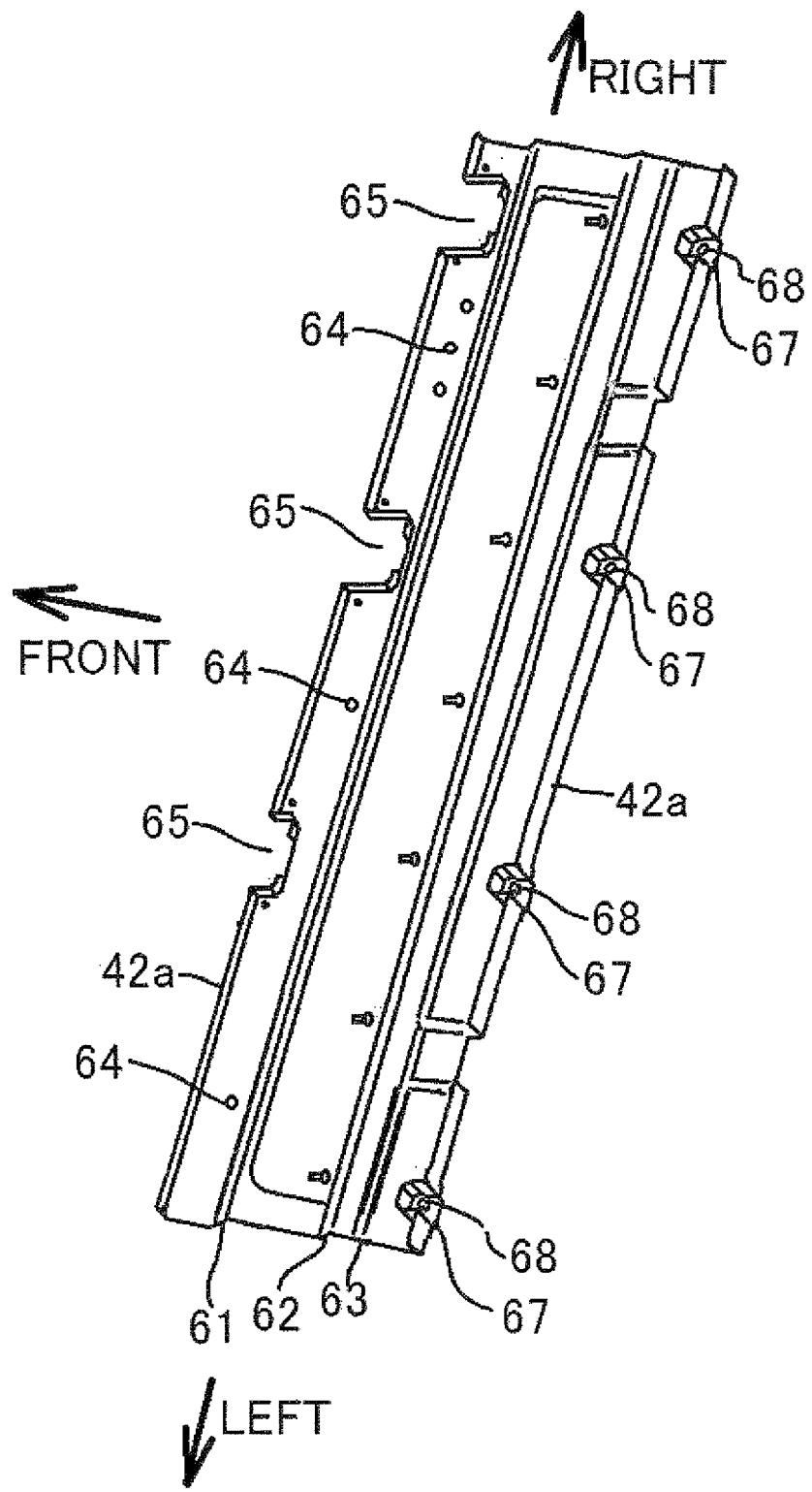
FIG. 6 is a perspective view showing a second partition wall of the utility vehicle of FIG. 1.

FIG. 6 shows the second partition wall 42. The second partition wall 42 is integrally provided with ribs 42a at both of front and rear edges of the second partition wall 42. The ribs 42a protrude upward. When viewed from the side, the entirety of the second partition wall 42 is formed in a stair shape consisting of three steps 61, 62, and 63. The steps 61, 62, and 63 are arranged at successively higher positions in the order from the front side to the rear side. The front end portion of the second partition wall 42 is provided with: a plurality (three) of attached holes 64 arranged with intervals in the vehicle width direction(the left and right direction); and three recesses 65 for retractor arrangement. The rear end portion of the second partition wall 42 is provided with four attached seats 67 arranged with intervals in the vehicle width direction. Each of the attached seats 67 is provided with a attached hole 68. The rib 42a at the rear end of the second partition wall 42 is formed in a U-shape when viewed from above at each portion corresponding to the attached seat 67 such as to detour each attached seat 67 frontward.

Figure 7:
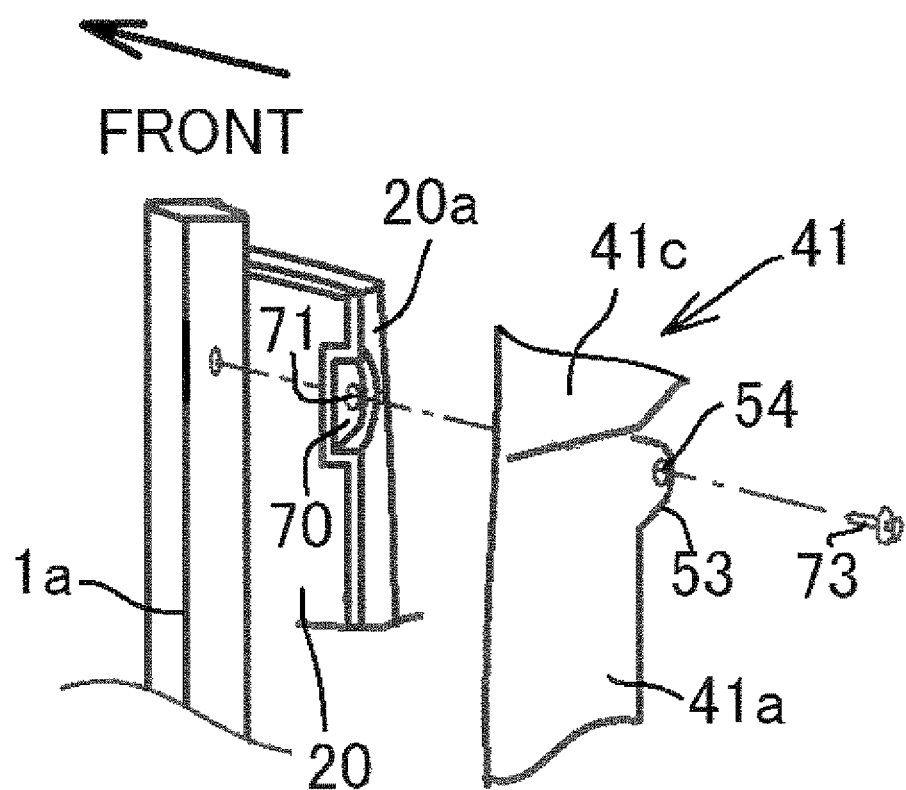
FIG. 7 is an enlarged perspective view of an end portion in a vehicle width direction of the first partition wall of the utility vehicle of FIG. 1.

FIG. 7 shows the attachment structure of the attached piece 53 of the main body 41a of the first partition wall 41. Each of the attached pieces 53 is fit into a recess 70 formed in a rear-end bent portion 20a of the side cover 20, and then is fixed to a rear surface of the seat frame 1a together with the recess 70 by means of a tapping screw 73 or a push rivet.

In FIG. 4, the upper-end attached portion 41d of the first partition wall 41 is fixed to a rear surface of a square-shaped cross pipe 1b with a plurality of tapping screws 80. The cross pipe 1b is arranged in the upper rear end portion of the seat frame 1a. Left and right end portions of the lower-end attached portion 41b of the first partition wall 41 are fixed to a lower-end frame portion of the side covers 20, with tapping screws 81.

Figure 8:
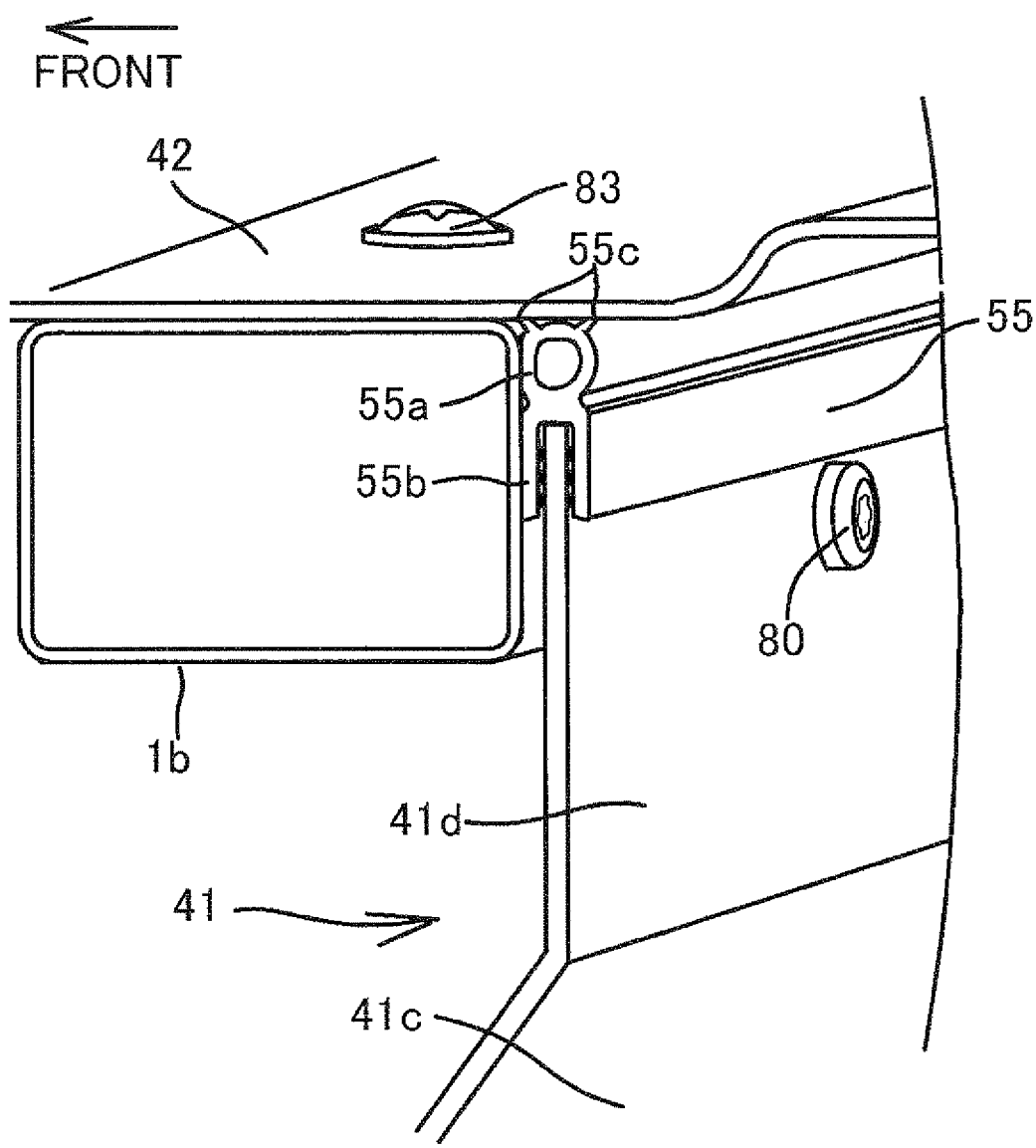
FIG. 8 is an enlarged perspective view of an upper end portion of the first partition wall of the utility vehicle of FIG. 1.

In FIG. 8, the front end portion of the second partition wall 42 is fixed to an upper surface of the square-shaped cross pipe 1b with a plurality of tapping screws 83. The square-shaped cross pipe 1b is arranged in the upper rear end portion of the seat frame 1a. The trim seal 55 fit onto the upper end of the first partition wall 41 includes a cylindrical head portion 55a and an U-shaped fitting portion 55b. Then, a pair of lip portions (horn portions) 55c protruding obliquely upward are formed in an upper face of the cylindrical head portion 55a. The pair of lip portions 55c are pressed against a lower surface of the second partition wall 42. Further, a front surface of the cylindrical head portion 55a and a front surface of the U-shaped fitting portion 55b are pressed against a rear surface of the cross pipe 1b. By virtue of this, the upper end portion of the first partition wall 41 is sealed.

Figure 9:
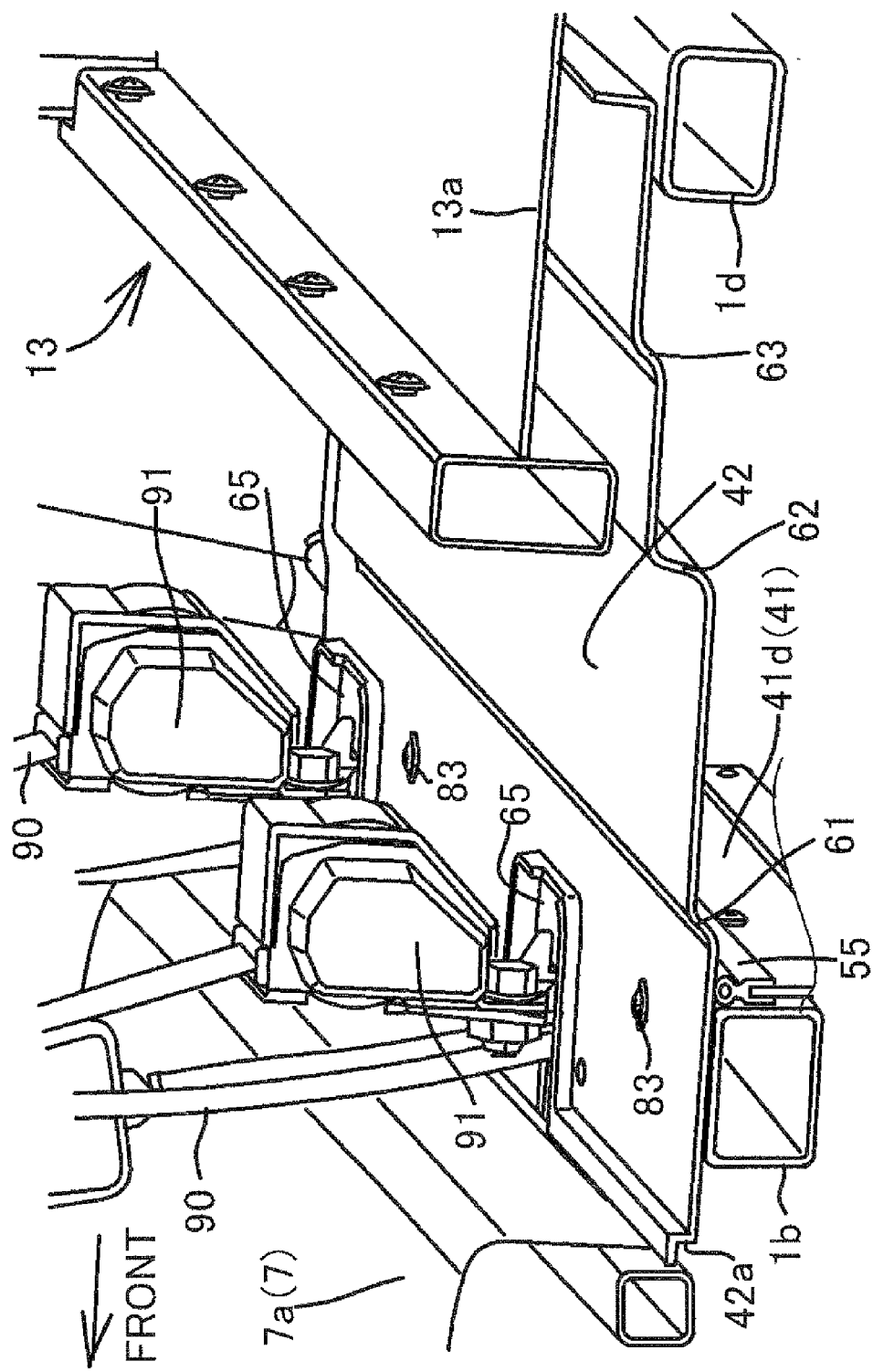
FIG. 9 is a sectional perspective view in which an upper front end portion of the engine chamber of the utility vehicle of FIG. 1 is viewed from a rear left side.

In FIG. 9, a retractor 91 of each seat belt 90 is located in an inside of each recess 65 formed in the front end portion of the second partition wall 42. A rear half portion of the second partition wall 42 passes under a front end portion of a baseplate 13a of the cargo bed 13 and then is fixed to the an upper surface of a cross pipe 1d. The cross pipe 1d is provided in an upper front end portion of the cargo bed support frame 1c.

In FIG. 10, the attached seat 67 formed in the rear end portion of the second partition wall 42 protrudes downward by a fixed amount relative to a lower surface of the rear end portion of the second partition wall 42. Then, the lower surface of the attached seat 67 is fixed to the upper surface of the cross pipe id of the cargo bed support frame 1c, with a push rivet 87 or the like. Thus, the lower surface of the rear end portion of the second partition wall 42 is slightly separated upward from the upper surface of the cross pipe 1d.

In the utility vehicle having the above-mentioned configuration, when lock of the cargo bed 13 by the latch devices 29 is released and then the cargo bed 13 is raised from the lowered position about the pivot shafts 26, the upper face of the engine chamber S3 is opened. By virtue of this, maintenance of the engine E, the gear type transmission 35, and the V-belt type continuously variable transmission 36 can be performed from above.

Effects of Embodiment (1) In the utility vehicle provided with the rear-side cabin wall 31, the lower space S1a of the cabin S1 located under the seat plate 7a and the front-side space S3a of the engine chamber S3 are shielded from each other by the first partition wall 41. Further, the front-side space S3a and the upper space S2 above the front-side space S3a are shielded from each other by the second partition wall 42. Furthermore, the upper space S2 and the cabin S1 are shielded from each other by the rear-side cabin wall 31. By virtue of this, a situation can be avoided that outside air such as exhaust air on the rear side of vehicle body flows through the lower space S1a under the seat plate 7a into the cabin S1. Further, the first partition wall 41 covers the front side of the engine E. This avoids a situation that heat of the engine E flows into the cabin S1.

(2) The front end of the engine chamber S3 is covered by the first partition wall 41 and the upper portion of the engine chamber S3 is covered by the second partition wall 42 and the baseplate 13a of the cargo bed 13. Thus, the engine E in the engine chamber S3 can be protected from mud, rain, dust, or the like in the outside (3) The cargo bed 13 is freely rotatable about the pivot shafts 26 on the rear side. Thus, with the cargo bed 13 is raised from the lowered position, the engine chamber S3 can easily be opened so that easy maintenance is ensured for the engine E, the gear type transmission 35, and the V-belt type continuously variable transmission 36.

(4) The trim seal 55 is attached to the outer peripheral edge portion of the first partition wall 41. This improves the sealing property between the lower space S1a of the cabin S1 and the engine chamber S3.

(5) The upper space S2 of the second partition wall 42 is surrounded by the rear-side cabin wall 31, the front panel 13b of the cargo bed 13, and the lower screen 13c. Thus, the upper space S2 on the rear side of the rear-side cabin wall 31 can be used as a baggage storage space. This increases the baggage loading space in the entire utility vehicle. Further, the second partition wall 42 can be used as a baggage placement base.

(6) The second partition wall 42 is formed in a stair shape going upward successively from the front side to the rear side. Thus, even when the upper end portion of the seat frame 1a is lower than the upper end portion of the cargo bed support frame 1c, the upper end of the seat frame 1a and the upper end of the cargo bed support frame 1c can easily be linked to each other without damaging external appearance.

(7) The attached seat 67 of the rear end portion of the second partition wall 42 protrudes below the bottom surface of the rear end portion of the second partition wall 42. Thus, when the attached seat 67 is to be fixed to the upper surface of the cross pipe 1d, the bottom surface portion other than the attached seat 67 is separated from the cross pipe 1d. By virtue of this, even when the rear end portion of the second partition wall 42 vibrates owing to engine vibration, occurrence of noise (rattling sound) is avoided that could be caused by contact between the cross pipe 1d and the rear end portion of the second partition wall 42. In particular, since the rear end portion of the second partition wall 42 is located near the engine E, the effect of avoiding the rattling sound is effective.

(8) The second partition wall 42 is provided with the ribs 42a located at the front and rear ends and protruding upward. Each rib 42a improves the sealing property.

Other Embodiments (1) The present invention may be applied to a utility vehicle provided with two seat rows arranged in the front-rear direction in the cabin S1.

(2) The first partition wall and the second partition wall may be made of a metal plate.

(3) The present invention is not limited to the structure of the embodiment. That is, various kinds of modifications are included as long as they do not depart from the scope described in the claims.

What is claimed is:

1. A utility vehicle comprising:
at least one seat row;
a cargo bed arranged behind the at least one seat row;

an engine chamber provided under the cargo bed;
a cabin for accommodating the at least one seat row;
a plurality of cabin walls for surrounding the cabin;
a first partition wall arranged under a rear-side cabin wall for covering a rear side of the cabin, the first partition wall partitioning the engine chamber and the cabin from each other; and
a second partition wall extended from an upper end portion of the first partition wall to a front end portion of the cargo bed, the second partition wall covering an upper front portion of the engine chamber.

2. The utility vehicle according to claim 1, wherein the cargo bed is turnable or rotatable around a pivot provided at a rear portion of the vehicle so as to raise a front portion of the cargo bed.

3. The utility vehicle according to claim 1, further comprising a vehicle body frame, wherein an outer peripheral edge portion of the first partition wall is attached to the vehicle body frame with a sealing member in between.

4. The utility vehicle according to claim 1, wherein an upper space above the second partition wall forms a space surrounded by the rear-side cabin wall and a front panel of the cargo bed.

\* \* \* \* \*